United States Patent
Herzog et al.

(10) Patent No.: US 10,759,117 B2
(45) Date of Patent: Sep. 1, 2020

(54) METHOD FOR PRODUCING A THREE-DIMENSIONAL COMPONENT

(75) Inventors: Frank Herzog, Lichtenfels (DE); Florian Bechmann, Lichtenfeld (DE); Sebastian Berumen, Mursbach (DE); Jean Pierre Kruth, Leuven (BE); Tom Craeghs, Heverlee (BE)

(73) Assignees: Concept Laser GmbH, Lichtenfels (DE); Katholieke Universiteit Leuven, Leuven (BE)

( * ) Notice: Subject to any disclaimer, the term of this patent is extended or adjusted under 35 U.S.C. 154(b) by 1041 days.

(21) Appl. No.: 13/812,446

(22) PCT Filed: May 19, 2011

(86) PCT No.: PCT/DE2011/001088
§ 371 (c)(1),
(2), (4) Date: Jan. 25, 2013

(87) PCT Pub. No.: WO2012/019577
PCT Pub. Date: Feb. 16, 2012

(65) Prior Publication Data
US 2013/0168902 A1    Jul. 4, 2013

(30) Foreign Application Priority Data

Jul. 28, 2010    (DE) .................... 20 2010 010 771 U

(51) Int. Cl.
*B29C 64/386*    (2017.01)
*B33Y 30/00*    (2015.01)
(Continued)

(52) U.S. Cl.
CPC .......... *B29C 64/386* (2017.08); *B22F 3/1055* (2013.01); *B23K 26/0622* (2015.10);
(Continued)

(58) Field of Classification Search
CPC ............ B29C 67/0088; B29C 67/0077; B23K 26/0622; B23K 26/705; B23K 31/12; B23K 31/125; B22F 3/1055
See application file for complete search history.

(56) References Cited

U.S. PATENT DOCUMENTS

| 5,382,770 A | 1/1995 | Black et al. |
| 5,530,221 A | 6/1996 | Benda |
(Continued)

FOREIGN PATENT DOCUMENTS

| CN | 1426335 A | 6/2003 |
| DE | 10007711 | 8/2001 |
(Continued)

OTHER PUBLICATIONS

Volume Visualization and Volume Graphics; Arie Kaufman and Klaus Mueller; Center for Visual Computing, Computer Science Department, Stony Brook University; pp. 1-35; 2003 (Year: 2003).*
(Continued)

*Primary Examiner* — Joseph S Del Sole
*Assistant Examiner* — John Robitaille
(74) *Attorney, Agent, or Firm* — Dority & Manning, P.A.

(57) ABSTRACT

A method for producing a three-dimensional component by means of a laser melting process, in which the component is produced by consecutively solidifying individual layers made of building material by melting the building material, wherein said building material can be solidified by the action of radiation, wherein the melting area produced by a punctiform and/or linear energy input is detected by a sensor device and sensor values are derived therefrom in order to evaluate the component quality. The sensor values detected in order to evaluate the component quality are stored together with the coordinate values that locate the sensor values in the component and are displayed by means of a
(Continued)

visualization unit in two- and/or multi-dimensional representation with respect to the detection location of the sensor values in the component.

21 Claims, 3 Drawing Sheets

(51) Int. Cl.
    *B23K 26/70*     (2014.01)
    *B23K 26/0622*     (2014.01)
    *B29C 64/153*     (2017.01)
    *B22F 3/105*     (2006.01)
    *B23K 31/12*     (2006.01)
    *B33Y 10/00*     (2015.01)
    *B33Y 40/00*     (2020.01)

(52) U.S. Cl.
    CPC ............ *B23K 26/705* (2015.10); *B23K 31/12* (2013.01); *B23K 31/125* (2013.01); *B29C 64/153* (2017.08); *B33Y 10/00* (2014.12); *B33Y 30/00* (2014.12); *B22F 2003/1056* (2013.01); *B22F 2003/1057* (2013.01); *B33Y 40/00* (2014.12); *Y02P 10/295* (2015.11)

(56) References Cited

U.S. PATENT DOCUMENTS

| | | | |
|---|---|---|---|
| 6,122,564 | A | 9/2000 | Koch |
| 6,580,959 | B1 | 6/2003 | Mazumder |
| 7,107,118 | B2 | 9/2006 | Orozco |
| 7,537,722 | B2 | 5/2009 | Anderson |
| 7,705,264 | B2 | 4/2010 | Hoebel |
| 2003/0059334 | A1 | 3/2003 | Shen et al. |
| 2004/0026389 | A1 | 2/2004 | Kessler |
| 2004/0026807 | A1* | 2/2004 | Andersson ............... B22F 3/004 264/40.1 |
| 2004/0173946 | A1 | 9/2004 | Pfeifer |
| 2004/0217095 | A1 | 11/2004 | Herzog |
| 2004/0251242 | A1 | 12/2004 | Suh |
| 2006/0032840 | A1 | 2/2006 | Bagavath-Singh |
| 2009/0050612 | A1* | 2/2009 | Serruys ................. B23K 26/032 219/121.83 |
| 2009/0152771 | A1 | 6/2009 | Philippi et al. |
| 2009/0206065 | A1 | 8/2009 | Kruth et al. |
| 2010/0133247 | A1 | 6/2010 | Mazumder |

FOREIGN PATENT DOCUMENTS

| | | |
|---|---|---|
| DE | 10120251 | 11/2002 |
| DE | 102007056984 A1 | 5/2009 |
| EP | 1466718 A2 | 10/2004 |
| EP | 2032345 B1 | 3/2009 |
| EP | 2598313 A2 | 6/2013 |
| JP | H09504054 A | 4/1997 |
| JP | 2001352562 A | 12/2001 |
| JP | 2004223789 A | 8/2004 |
| JP | 2005018532 A | 1/2005 |
| JP | 2009006509 A | 1/2009 |
| WO | WO0181031 | 11/2001 |
| WO | 2007147221 A1 | 12/2007 |

OTHER PUBLICATIONS

International Search Report, dated Mar. 14, 2012, issued for International Publication WO 2012/019577 A3 published Feb. 16, 2012.
Ramos-Grez, et al., "Direct Metal Laser Fabrication of Cu slabs from powder precursor: surface depth of melt and furnace temperature issues," Mechanical and Metallurgical Engineering Department, Pontificia Universidad Catolica de Chile 2002, pp. 246-260.
Hu, et al., "Modelling and measuring the thermal behaviour of the molten pool in closed-loop controlled laser-based additive manufacturing", Proceedings of the Institution of Mechanical Engineers, Part B: Journal of Engineering Manufacture 2003 217:441-452.
Kaufmann, et al., "Volume Visualization and Volume Graphics", Center for Visual Computing, Computer Science Department, Stony Brook University, 2003, pp. 1-35.
Asselin, et al., "Development of Trinocular CCD-Based Optical Detector for Real-Time Monitoring of Laser Cladding", Proceedings of the IEEE International Conference on Mechatronics & Automation, pp. 1190-1196 (Niagara Falls, Canada, Jul. 2005).
Salehi, et al., "Melt pool temperature control using LabVIEW in Nd:YAG laser blown powder cladding process", Int J Adv Manuf Technol (2006) 29: 273-278.
Fischer, "Data fusion and shape retrieval methods for 3D geometric structures," Technion—Israel Institute of Technology, Haifa, Israel 2006, pp. 15-21.
Niggemann, "Studienarbeit Bildanalyse zur Automatisierung eines Fertigungsprozesses", Jul. 2006, Universität Paderborn, Fakultät für Elektrotechnik, Informatik and Mathematik GET-Lab, Germany.
Sackett, et al., "A review of data visualisation: opportunities in manufacturing sequence management", International Journal of Computer Manufacturing, vol. 19, Issue 7 Oct. 2006, 689-704.
Seimens AG, "Advanced NDE Systems for Flexible Operation and Maintenance of Gas Turbine Components," POWER-GEN International 2006, Orlando, FL Nov. 28-30, 2006.
Sanz-Guerrero et al., "Copper powder densification by means of DMLF process: The effect of energy density input and oxidation," Mechanical and Metallurgical Engineering Department, Macul, Santiago, Chile 2007, pp. 375-381.
Smurov, "Laser process optical sensing and control" Proceedings of the Fourth International WLT-Conference on Lasers in Manufacturing 2007, Munich, Jun. 2007, pp. 537-546.
Doubenskaia et al., "On-Line optical minotoring of Nd: YAG laser lap welding of Zn-coated steel sheets," Proceedings of the Fourth WLT-Conference on Lasers in Manufacturing 2007, Munich, Jun. 2007, pp. 547-552.
MCP Group, "Betriebsanleitung SLM—Realizer 250," Jun. 2007, Germany.
Heralic, et al., "Control Design for Automation of Robotized Laser Metal-wire Deposition", The International Federation of Automatic Control, Proceedings of the 17th World Congress, Seoul, Korea, Jul. 6-11, 2008, pp. 14785-14791.
Tang, et al., "Layer-to-Layer Height Control for Laser Metal Deposition Processes", Solid Freeform Fabrication Symposium Proceedings, Missouri, Aug. 4-6, 2008, 473-494.
Heralic, et al., "Increased stability in laser metal wire deposition through feedback from optical measurements", Optics and Lasers in Engineering, vol. 48, Issue 4, Apr. 2010, pp. 478-485.
Doubenskaia et al., "Optical System for On-Line Monitoring and Temperature Control in Selective Laser Melting Technology," Key Engineering Materials vol. 437 (2010) pp. 458-461.
Ahn et al., "Real-time measurement of temperature for control of laser surface modification process," Laboratory for Freeform Fabrication, Department of Mechanical Engineering, The University of Texas at Austin, Texas, pp. 150-158.
"Bontha, et al., ""Thermal Process Maps for Controlling Microstructure in Laser-Based Solid Freeform Fabrication,"" Department of Mechanical andMaterials Engineering, Wright State University, Dayton, Ohio, pp. 219-226".
Kruth, et al., "Feedback control of Selective Laser Melting", Department of Mechanical Engineering, Catholic University of Leuven, Heverlee, Belgium, pp. 1-7.
Abels et al., "Universal coaxial process control system for laser materials processing", Proceedings of the Laser Materials Processing Conference, 1999, vol. 87, pp. 99-107.
Beersiek, "New Aspects of Monitoring with a CMOS camera for Laser Materials Processing", Prometec GmbH, Aachen, Germany, 2002.
Poprawe, "Lasertechnik für die Gertigung", Grundlagen, Perspektiven und Beispiele für den innovativen Ingenieur, Springer Berlin Heidelberg, 2005, pp. VI and 229.
International Search Report Corresponding to Application No. PCT/DE2011/001088 dated Mar. 27, 2012.

(56) References Cited

OTHER PUBLICATIONS

International Written Opinion Corresponding to Application No. PCT/DE2011/001088 dated Jan. 28, 2013.
Chinese Office Action Corresponding to Application No. 201180036741 dated Aug. 5, 2014.
Japanese Office Action Corresponding to Application No. 2013520966 dated. Feb. 24, 2015.
Chinese Office Action Corresponding to Application No. 201180036741 dated Apr. 10, 2015.
Japanese Office Action Corresponding to Application No. 2013520966 dated Oct. 29, 2015.

\* cited by examiner

METHOD FOR PRODUCING A THREE-DIMENSIONAL COMPONENT

BACKGROUND OF THE INVENTION

The present disclosure relates to a method for producing a three-dimensional component by a laser melting process, in which the component is produced by successive solidification of individual layers of building material which can be solidified by the action of radiation, by fusing the building material, having the further features of the preamble of claim 1.

Moreover, the present disclosure also relates to a device for carrying out this method and to the use of a visualization apparatus for two-dimensional or multidimensional, preferably 2D or 3D, representation of component regions of components produced in generative fashion by the action of radiation on powder-like building material in respect of the component quality thereof.

DISCUSSION OF RELATED ART

WO 2007/147221 has disclosed a device and a method for monitoring and for controlling a selective laser melting construction process. The illustrated device for selective laser powder processing comprises a build platform with a powder bed, a powder deposition system for applying a powder surface to the build platform, a laser, the focused laser beam of which impinges on the powder surface and causes the powder to melt within a melt zone. The laser beam is guided over the powder surface by means of a scanner device. Moreover, provision is made for a detector for capturing electromagnetic radiation which is emitted or reflected by the powder surface and interacts with an optical system that follows the laser beam and is suitable for guiding the radiation in the direction of the detector.

The detector of the known device is embodied such that it can capture the electromagnetic radiation emitted or reflected by a moveable observation region on the powder surface, wherein the moveable observation region is greater than the minimum laser spot of the laser beam. As a result, it is possible to capture the melt pool created in the powder bed.

The detector can be used to establish the size of the melt zone, in particular the length and width and a length-to-width ratio. Moreover, it is possible to select specific parts of the electromagnetic spectrum of the radiation emitted by the melt pool.

SUMMARY

In accordance with the present disclosure there is provided a method having the features of the preamble of claim 1 and an associated device for carrying out the method such that the values captured thereby can be evaluated more easily. This object is achieved by virtue of the fact that sensor values captured for evaluating component quality are stored together with coordinate values localizing the sensor values in the component and are displayed by means of a visualization apparatus in a 2D or 3D representation in respect of the capture location thereof in the component.

In other words, the object is achieved by virtue of the fact that the sensor values captured for evaluating the component quality are stored together with the coordinate values localizing the sensor values in the component and are displayed by means of a visualization apparatus in two-dimensional and/or multidimensional representations in respect of the capture location thereof in the component. The sensor device is able to operate, preferably in respect of the dimensions, shape and/or temperature of the effects of the point- and/or line-shaped energy influx detected in the melt region.

In a preferred embodiment, sensor values of a component plane are displayed in the case of a 2D representation, which sensor values correspond to a layer which is solidified by the action of radiation from a new deposition of building material. In particular, it is advantageous if sensor values of a freely selectable component sectional plane are displayed in the case of a 2D representation, which plane extends at an angle (e.g. at right angles or at an angle less than 30°) to a layer successively solidified by the action of radiation. In particular, the sectional plane can be freely selectable both in terms of its angle and in terms of its position within the fictitious installation space on the screen of the visualization apparatus, similar to what is also the case in commercially available 2D/3D CAD computer programs.

Furthermore, it is advantageous if in the case of a two-dimensional and/or multidimensional representation only sensor values are displayed visually and/or highlighted which represent component regions which, compared to at least one definable (predefined) intended degree of solidification or intended temperature value or intended density value, have a deviating, more particularly reduced, degree of solidification or temperature value or density value. It is likewise possible, in addition to the degree of solidification, the temperature value and the density value, also to use an intended energy influx and/or intended melt pool dimensions as a basis for displaying the deviation and/or highlighting.

By way of example, these regions can be highlighted by a targeted selection of different colors, grayscale values, degrees of transparency and/or in respect of an areal structure (shading type such as dotted, respectively obliquely ruled at different angles, etc.).

Furthermore, the coordinate values localizing the sensor values in the component can, at least in part, be the component coordinates used to produce the component. It is likewise possible to position or localize or assign the sensor values to a coordinate value both by means of using the build coordinate values (the information underlying the building process) and, exclusively or additionally, by means of using localization sensors detected during the building process by means of further sensors.

In a further advantageous embodiment, coordinates are assigned to the sensor values by means of exposure data or scanner data. Additionally, or as an alternative thereto, it may also be advantageous if during the areal capture of the whole build plane or the section comprising the component cross section the coordinates of a radiation energy influx of the component plane are captured and assigned to the sensor values and the position of the component plane (Z coordinate) is captured separately.

These days, visualization apparatuses are used in conjunction with X-ray and computed tomography technology and generally serve to display sensor values which are captured metrologically as a result of the named methods in an existing, i.e. present in the completed state, body.

The visualization method and an associated visualization device (software) of the present disclosure are implemented in conjunction with a generative production process and are used to display values captured in the melt pool during the building process in a more effective fashion in order, directly after the completion of and/or still during the building process, to provide an operator of such a laser melting apparatus with information as to whether the solidified component layers satisfy the requirements placed on the component in respect of fusion, temperature profile, work piece solidity, etc. Should a component produced in generative fashion be found not to be solid enough and at a later date give rise to a user complaint, then e.g. archived, build-historic visualization information can be used to check very quickly whether e.g. a breakpoint of the tool was in actual fact produced according to the design specifications or whether there were upward or downward deviations (e.g. in tolerance ranges). It is possible to check, particularly if fine structures are present within the component, whether the degree of fusion, the temperature profile after heat reductions, the component density and the like were set in such a fashion there that breakage should be avoided. For future building projects, such insight can be used to avoid work piece breakage and/or material failure.

When claim 1 refers to a two-dimensional or multidimensional representation, this means either that a two-dimensional image of the visualized sensor values is displayed, with the sensor values lying in a sectional plane, e.g. a component plane, or in a plane extending at an angle to the build plane, or that in the case of a 3D representation the component is displayed in virtually transparent fashion and adjustments of the component quality are illustrated on the basis of the established sensor values and the coordinate values, e.g. build coordinate values, correlated thereto.

In a development of the method, it is possible in the case of a 2D or 3D representation only to visually filter out sensor values which represent component regions which, compared to a definable intended degree of solidification, have a deviating, more particularly reduced, degree of solidification. Naturally, the same also applies to representations of e.g. the melt temperature, the density and the like.

In the process, an optimized value can be displayed in a first color, a first grayscale value and/or with a first areal structure and values deviating upward or downward from this optimized value are displayed differently in terms of color, grayscale value and/or in respect of the areal structure (e.g. the type of shading). This allows an observer of such a 2D or 3D image immediately to obtain information in respect of whether the building process proceeded in an optimal fashion or whether the component may, under certain circumstances, have weaknesses.

The coordinate values localizing the sensor values in the component can be the build coordinate values used to produce the component. These are the values which are used to guide the laser beam over the powder surface and values that represent a Z coordinate in respect of the layer number. However, it is also possible to newly obtain the coordinate values localizing the sensor values in the component when capturing the sensor values, i.e. to scan the component surface to be solidified at this time using a suitable scanning method and to store values that correspond to a solidification point (point of energy influx into the powder bed) in the layer. This can be brought about by virtue of the fact that either there is an areal capture of the whole build plane or all that is captured is only a section of interest in the build plane, which contains the component region.

Provision is also made within the scope of the present disclosure for the sensor values to be captured not directly at the moment of the energy influx but, additionally or alternatively, offset in time thereafter. By way of example, if the temperature in the melt pool is captured at a time T0 (during the energy influx) and then at later times, e.g. 0.5 seconds, 1 second, 1.5 seconds or the like, it is then possible to obtain information about the heat flux in the component during the building process from sensor values to be visualized thus in order, for example, to avoid overheating effects in the case of very fine component interior regions. By way of example, such time-offset capturing methods are referred to as sampling microscope methods in microscopy.

In addition to the conventional components of a laser melting apparatus with a sensor device as per WO 2007/147221 A1, the device for carrying out the method of the present disclosure additionally comprises a storage apparatus, in which the sensor values captured for evaluating the component quality are stored together with coordinates localizing the sensor values in the component, and a visualization apparatus, which is connected to the storage apparatus and by means of which it is possible to display the stored sensor values in e.g. a 2D or 3D colored or grayscale representation in respect of the capture value thereof in the component.

BRIEF DESCRIPTION OF THE DRAWINGS

The method and apparatus of the present disclosure are explained in more detail with reference to the figures. In these.

DETAILED DESCRIPTION

Figure 1:
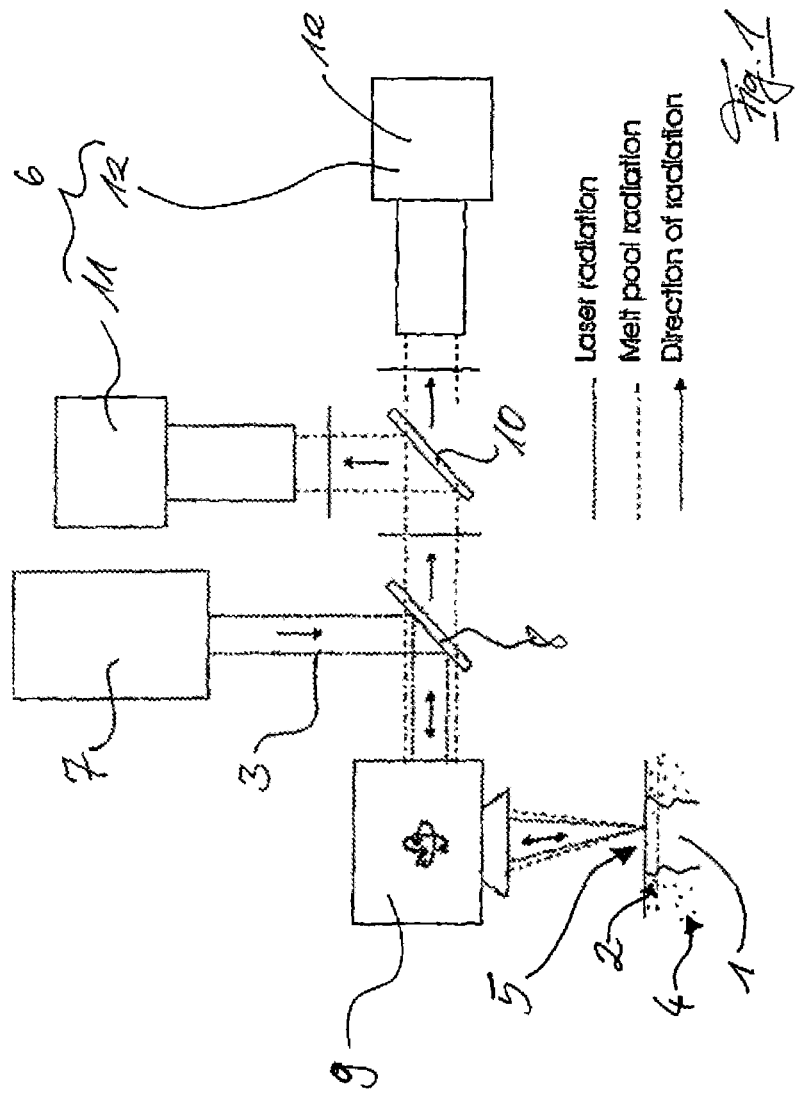
FIG. 1 shows a schematic illustration of a coaxial monitoring process system using two vectors as per the prior art.

FIG. 1 illustrates a device according to the prior art, wherein this device comprises a method for producing a three-dimensional component 1 by a laser melting process. The component 1 is produced by successive solidifying of individual layers 2 (indicated as dashed line) of building material 4 which can be solidified by the action of radiation 3, by fusing the building material 4. The melt region 5 created by a point- and/or line-shaped energy influx is captured by a sensor device 6 (e.g. camera 11 and photodiode 12) in terms of its dimensions, shape and/or temperature, and the sensor values resulting therefrom are derived for evaluating component quality.

In the illustrated embodiment of the prior art as per FIG. 1, the radiation 3 is generated by a laser source 7 (laser). It is subsequently deflected by a semi-reflective mirror 8 and guided to the layer 2 to be solidified of the building material 4 via a scanner 9 with preferably a focusing lens. The radiation generated at the melt region 5 travels this path in the opposite direction and passes through the semi-reflective mirror 8 in a straight line such that said radiation reaches a beam splitter 10 and there, if deflected, it is guided to a first detector, preferably a camera 11, and, when passing straight through the beam splitter 6, it is guided to a second detector, for example a photodiode 12.

Figure 2:
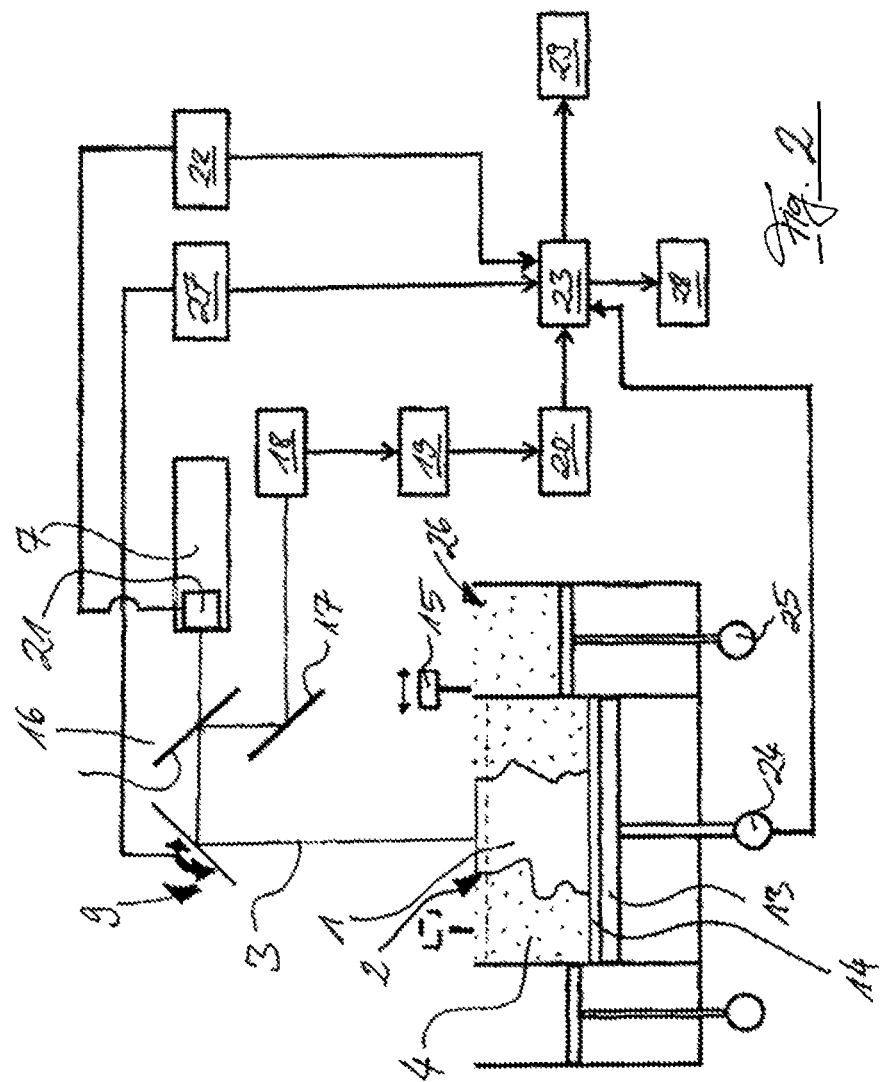
FIG. 2 shows a schematic illustration of a typical selective laser process machine with means according to the present disclosure for capturing and evaluating the sensor values.

FIG. 2 now illustrates the extension of the system known from the prior art. The component 1 which is assembled on a base plate 14 in the build region on a height-displaceable support 13 using said base plate 14 is assembled layer-by-layer (cf. layer 2) in the powder bed of the powdery building material 4. A deposition apparatus 15 transports the building material 4 to the build region from a metering chamber 26.

Proceeding from a laser 7, the radiation 3 is directed at the component 1 via the scanner 9 after passing straight through a mirror 16 that can be passed through from one side. The radiation reflected by the component is guided via the scanner 9 and the mirror 16, which is completely reflective in this direction, to a further deflection mirror 17 and finally to a detector of a sensor apparatus 6, 11, 12, 18. This detector transmits a signal to a processor 19, preferably a microprocessor, the output of which reaches a storage medium 20.

The laser 7 is preferably provided with a beam manipulation apparatus 21, which for example is designed in the style of a mode aperture, a grating filter or other optical elements. This beam manipulation apparatus 21 is actuated by a controller 22, the control data of which, like the processor data from the processor 19 stored in the storage medium 20, merge in a data linkage and/or data assignment unit 23. It is likewise possible in the data linkage/data assignment unit 23 to collect and assign to one another control data from the scanner 9 and/or control data in respect of the height displacement of the support 13, preferably by means of the actuator 24 thereof. Naturally, it is also possible to supply to the data linkage/data assignment unit 23 control data from the depositor of the deposition apparatus 15 and/or of the supply mechanism for building material for a corresponding component layer 2 (by way of example, this could be realized by the control data from the actuator 25 of the metering chamber 26). It is also possible for a control module 27 of the scanner to be arranged between the scanner 9 and the data linkage/data assignment unit 23. The data collected in the data linkage/data assignment unit 23 and assigned to one another (e.g. data tuple) can then be processed further in a further data processing unit 28 and/or be visualized via a visualization element 29. It is also possible to provide an interface for a data storage medium instead of a data processing unit 28. For example, a monitor, a beamer or a holograph can all be used as visualization element.

Finally, the sensor values captured for evaluating the component quality are stored together with the coordinate values localizing the sensor values in the component 1 and said sensor values are displayed, in relation to the point of capture in the component 1, in two-dimensional and/or multidimensional representations by means of the visualization apparatus 29.

Figure 3:
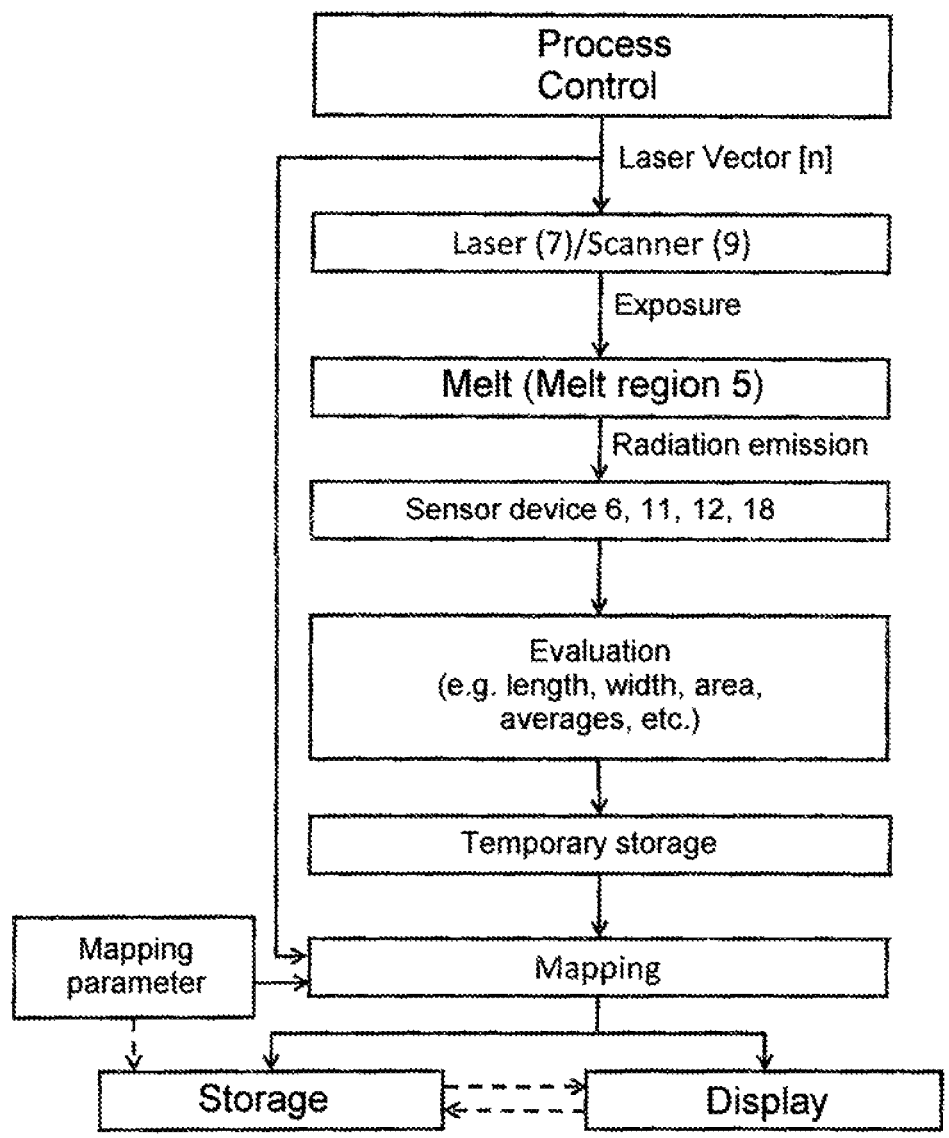
FIG. 3 shows a flowchart which illustrates essential processes of a preferred method according to the present disclosure.

FIG. 3 in an exemplary fashion illustrates an advantageous process of the method according to the present disclosure. The process control acts on the laser 7 and/or the scanner 9 and regulates the properties of the laser beam 3 via the laser vector [n]. The building material 4 is exposed proceeding from the scanner 9, as a result of which a melt or the melt region 5 forms. Radiation is emitted from the melt region 5 and it is detected by the sensor device 6, 11, 12, 18. The result of this detection leads to an evaluation (e.g. according to the length, width, area, etc.), leading to temporary storage of the evaluation. This temporarily stored evaluation is subjected to so-called mapping. This mapping is preferably based on definable/modifiable mapping parameters (contrast, color, detector selection, threshold regions, etc.). Post mapping, this is displayed by the visualization apparatus 29 and/or stored. In doing so, it is advantageous if the mapping parameters also underlie the storage and/or the representation, i.e. that the mapping parameters are also stored and/or also displayed by the visualization apparatus 29.

While the method and apparatus of the present disclosure have been described with reference to certain embodiments, numerous modifications, alterations and changes to the described embodiments are possible without departing from the spirit and scope of the present disclosure, as defined in the appended claims. Accordingly, it is intended that the method and apparatus of the present disclosure not be limited to the described embodiments, but that it has the full scope defined by the language of the following claims, and equivalents thereof.

The invention claimed is:

1. A laser melting system configured for performing a selective laser powder processing, the system comprising:
   a powder application device;
   a three-dimensional component produced by successive solidification of individual layers of a powdered building material provided by the powder application device that can be solidified by the action of radiation, by fusing the powdered building material, wherein a melt region created within the powdered building material is created by an energy influx and the melt region is captured by a sensor device and sensor values for evaluating component quality are derived from the melt region,
   a storage apparatus, in which the sensor values from the melt region captured for evaluating component quality are correlated with coordinate values localizing the sensor values in the three-dimensional component to generate a component quality output, and
   a visualization apparatus which is connected to the storage apparatus, the visualization apparatus configured to display, based at least in part on the component quality output, a two-dimensional and/or multidimensional visual representation comprising build coordinates provided to the laser melting apparatus and the sensor values in respect of a capture location thereof in the three-dimensional component; and
   wherein the component quality output is used to accept, reject, or modify the three-dimensional component.

2. The system as claimed in claim 1, wherein the component quality output comprises:
   a degree of fusion of the powdered building material when the powdered building material solidifies; and/or
   a temperature in the melt region of the powdered building material when the powdered building material solidifies; and/or
   a temperature profile in the melt region of the powdered building material when the powdered building material solidifies.

3. The system as claimed in claim 1, wherein the coordinate values localizing the sensor values in the three-dimensional component are obtained by an areal capture of a section of a build plane comprising a component region.

4. The system as claimed in claim 1, wherein sensor values of a component plane of the three-dimensional component are displayed in a two-dimensional representation, which sensor values correspond to an individual layer which is solidified by the action of radiation prior to a new deposition of powdered building material.

5. The system as claimed in claim 1, wherein sensor values of a freely selectable component sectional plane are displayed in the component quality output in a two-dimensional representation, which plane extends at an angle to a layer successively solidified by the action of radiation.

6. The system as claimed in claim 1, wherein only those sensor values are displayed in the component quality output which represent component regions which, compared to at least one definable degree of solidification.

7. The system as claimed in claim 1, wherein, in order to display the sensor values in the component quality output, a sensor value representing an optimized value with respect to the powdered building material is displayed in a first color, and values deviating from this optimized value are displayed in a different color.

8. The system as claimed in claim 1, wherein the coordinate values localizing the sensor values in the three-dimensional component at least in part are newly obtained when deriving the sensor values.

9. The system as claimed in claim 1, wherein coordinate values are assigned to the sensor values in accordance with exposure data.

10. The system as claimed in claim 1, wherein derivation of at least some of the sensor values takes place with a time delay with respect to the time of the energy influx, and the values of the component quality output displayed by the visualization apparatus exhibit a time profile of thermal behavior of the melt region.

11. The system as claimed in claim 1, wherein only those sensor values of the component quality output are displayed which represent component regions which, compared to at least one definable intended temperature or density value, have a deviating temperature or density value; and/or
wherein only those sensor values of the component quality output are displayed which represent component regions which exhibit deviations with respect to intended melt pool dimensions.

12. The system as claimed in claim 1, wherein, in order to display the sensor values of the component quality output, a sensor value representing an optimized value with respect to the building material is displayed with a first areal structure and values deviating upward or downward from this optimized value are displayed differently in respect of an areal structure.

13. The system as claimed in claim 1, wherein the component quality output comprises data associated with an intended degree of solidification, an intended temperature value, an intended density value, an intended energy influx, and intended melt region dimensions,
wherein deviations of the component quality output from a predetermined intended value of at least one of solidification, temperature value, density, energy influx and melt region dimension are displayed in terms of degrees of transparency and/or areal structure.

14. The system as claimed in claim 1, wherein the three-dimensional component is modified during solidification of the powdered building material.

15. A laser melting system, the system comprising:
a laser melting apparatus operably configured to produce a three-dimensional component by successive solidification of layers of a powdered building material, the laser melting apparatus comprising:
a build region having a height-displaceable support configured to support a powder bed of the powdered building material and a component formed therefrom;
a deposition apparatus operably configured to transport the powdered building material to the build region layer-by-layer;
a laser source and a scanner operably configured to direct a beam of radiation to a melt region of the powder bed, the beam of radiation providing an energy influx that generates a melt pool in the melt region;
a sensor device operably configured to capture sensor values corresponding to the melt pool and/or the melt region and to transmit the sensor values to a storage apparatus, the storage apparatus configured to correlate the sensor values from the melt pool and/or the melt region with coordinate values localizing the sensor values in the three-dimensional component and to generate a display output, the coordinate values comprising build coordinates provided to the laser melting apparatus; and
a visualization apparatus configured to display, based at least in part on the display output, a two-dimensional and/or a multidimensional representation of the three-dimensional component comprising the build coordinates provided to the laser melting apparatus and the sensor values in respect of a capture location thereof in the three-dimensional component.

16. The laser melting system of claim 15, wherein the two-dimensional and/or the multidimensional representation comprises image data of the three dimensional component.

17. The laser melting system of claim 16, wherein the two-dimensional and/or the multidimensional representation comprises the sensor values mapped to the image data of the three dimensional component.

18. The laser melting system of claim 15, wherein the storage apparatus is configured to determine the size of the melt pool based at least in part on selecting from the sensor values specific parts of the electromagnetic spectrum of the radiation emitted by the melt pool.

19. The laser melting system of claim 15, wherein the coordinate values comprise newly obtained coordinate values, the sensor configured to capture the newly obtained coordinate values.

20. The laser melting system of claim 15, wherein the two-dimensional and/or the multidimensional representation comprises component regions having a deviation from an intended value being selectively displayed and/or highlighted.

21. The laser melting system of claim 20, wherein the intended value corresponding to a degree of solidification, degree of fusion, melt temperature, density, energy influx, melt pool dimension.

* * * * *